United States Patent [19]

Steidle et al.

[11] Patent Number: 5,239,457
[45] Date of Patent: Aug. 24, 1993

[54] REDIRECT ROLLER CONTROL FOR FIBER PLACEMENT MACHINE

[75] Inventors: Richard L. Steidle, Cincinnati; David C. Swope, North Bend, both of Ohio

[73] Assignee: Cincinnati Milacron Inc., Cincinnati, Ohio

[21] Appl. No.: 553,518

[22] Filed: Jul. 16, 1990

[51] Int. Cl.$^5$ .................. G06F 15/46; B32B 31/00
[52] U.S. Cl. ..................... 364/167.01; 242/7.21; 156/441; 156/361; 364/469
[58] Field of Search ............. 395/82, 97; 364/167.01, 364/478, 469; 242/7.21, 7.01, 7.11, 157 R; 156/361, 425, 441, 574; 226/196, 199

[56] References Cited

U.S. PATENT DOCUMENTS

| | | |
|---|---|---|
| 3,476,327 | 4/1969 | Vawter . |
| 4,348,623 | 9/1982 | Kobayashi et al. ............ 395/82 |
| 4,541,062 | 9/1985 | Kada et al. ................... 395/82 |
| 4,610,402 | 9/1986 | Corbett et al. . |
| 4,712,183 | 12/1987 | Shiroshita et al. ............ 395/87 |
| 4,830,298 | 5/1989 | Van Blunk . |
| 4,872,619 | 10/1989 | Vaniglia . |
| 4,877,471 | 10/1989 | McCowin et al. . |

FOREIGN PATENT DOCUMENTS 0079735 5/1983 European Pat. Off. .
0434496 6/1991 European Pat. Off. .
1442992 7/1976 United Kingdom .

OTHER PUBLICATIONS

European Search Report mailed Jun. 24, 1992 from the European Patent Office in Case Serial No. EP91 11 6725.
Evans, Vaniglia and Hopkins; Fiber Placement Study; SAMPE 34th Symposium Book of Proceeding (May 8-100, 1989).
Page 27; American Machinist; Sep. 1989.

Primary Examiner—Joseph Ruggiero
Attorney, Agent, or Firm—Thomas M. Farrell

[57] ABSTRACT

To maintain alignment of a band of fiber tows as it travels between a source of such tows and a fiber placement head in a computer controlled fiber placement machine, a pair of redirect rollers are provided, at least one of which is automatically and drivingly swivelled by an amount related to commanded movement of the fiber placement head relative the source of tows so as to maintain alignment of the fiber band between the source and the fiber placement head such that a vector normal the fiber band and across the width thereof is parallel the longitudinal axis of rotation of the redirect roller as the fiber band passes thereover.

12 Claims, 9 Drawing Sheets

REDIRECT ROLLER CONTROL FOR FIBER PLACEMENT MACHINE

BACKGROUND OF THE INVENTION

I. Field of the Invention

The present invention relates to computer controlled fiber placement machines which apply fiber tows to construct components. More particularly, the present invention relates to maintaining alignment of the fiber tows as they progress between a fiber supply and a tool which moves about under computer program control to apply the fiber tows.

II. Description of the Prior Art

By way of background, a computer controlled fiber placement machine includes a creel assembly which feeds a band of individual fiber tows under tension to a tool such as a fiber placement head. The fiber placement head is mounted to a robot wrist, for example, and is thus movable under program control through a wide variety of spatial orientations. As the fiber placement head moves about, fiber tows are applied to a mandrel, for example, to construct a component such as an air foil. Typically, the creel assembly is spaced from the fiber placement head, thus allowing for substantial movement of the fiber placement head relative the creel assembly. As the fiber placement head moves in a wide variety of patterns relative the creel assembly, however, the band of fiber tows therebetween will twist and bend. To this end, the band of tows may be threaded about a pair of redirect rollers which guide the band between the creel assembly and the fiber placement head, the redirect rollers being adapted to swivel about an axis perpendicular their rotational axes so that as the fiber placement head moves, tension on the tows will cause the redirect rollers to swivel in a manner tending to maintain the fiber tows in alignment and reduce the likelihood of damage to the tows.

If the tension on the tows is relatively low, or if the tow pregs are tacky, however, one or both of the redirect rollers may not swivel sufficiently, in which event the fiber tows may be damaged or the machine shut down. For example, if there is insufficient swivel of the redirect rollers, one or more of the tows may rub against each other or the edges of a roller, or may even come away from a roller altogether.

SUMMARY OF THE INVENTION

The present invention reduces the likelihood that the redirect rollers will not swivel sufficiently as the fiber placement head moves. To this end, and in accordance with the principles of the present invention, one or both of the redirect rollers are drivingly and automatically swivelled under computer control to an angle related to program controlled movement of the fiber placement head relative the creel assembly. More particularly, the computer control calculates the swivel angles of the redirect rollers necessary to compensate for such commanded movement of the fiber placement head. One or both of the redirect rollers are then drivingly swivelled in accordance with the computed swivel angles so as to maintain alignment of the fiber tows passing over the redirect rollers.

As will be appreciated, users of computer controlled fiber placement machines typically program the computer control in so-called world coordinates which define selected points of tow application relative the frame of the machine, such as at the centerpoint of the robot wrist supporting the fiber placement head. The computer control manipulates these world coordinate inputs to divide them into a plurality of incremental tool paths between each pair of world coordinates input by the user so as to define a plurality of incremental moves of the various parts of the machine by which to cause the fiber tows to be applied between the world coordinate pairs. The user is, thus, not typically involved in programming every minute move of the machine nor in making the numerous adjustments, calculations and transformations which are necessary to implement the user input world coordinate moves. By way of example, to apply fiber tows between two world coordinates input by the user, the computer control may generate several dozen incremental command signals as a result of which the fiber placement head may change its position numerous times as it traverses between the two points. So, too, the redirect rollers may need to swivel accordingly.

Preferably, the appropriate swivel angles of the redirect rollers are computed based upon the same incremental command signals generated by the computer control which cause the incremental moves of the fiber placement head. In accordance with the present invention, there is thus no need for a user of a computer controlled fiber placement machine to undertake the extremely difficult and error prone task of programming the control with redirect roller swivel angles for each incremental move of the head. Rather, the computer control automatically and accurately defines desired redirect roller swivel angles and drivingly adjusts the swivel angle of one or both of the redirect rollers accordingly.

By virtue of the foregoing, as the fiber placement head moves relative the creel assembly, one or both of the redirect rollers will be automatically caused to swivel to an angle sufficient to maintain alignment of the fiber tows and to reduce the likelihood of damage thereto, even when there is relatively low tension on the tows and/or the tow pregs are tacky.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE DRAWINGS

To illustrate the present invention, an exemplary embodiment of a first program controlled fiber placement machine shall be described in detail. The machine 10 to be described herein may be a Model T3-886 Gantry Series Industrial Robot available from Cincinnati Milacron Inc., the assignee of the present invention. Control 120 which communicates with machine 10 over communication lines 110 may be an Acramatic 975-C CNC also available from Cincinnati Milacron as described in "Feature Descriptions for the Cincinnati Milacron Acramatic 975-C", Publication No. CTL-452, revised Jan. 28, 1986. Publication No. CTL-452 is incorporated herein by reference. For fiber placement, the designation A975-F may be employed for the control. Machine 10 is described in greater detail in U.S. Pat. No. 4,872,619, assigned to the assignee of the present invention. The disclosure of aforementioned U.S. Pat. No. 4,872,619 is incorporated herein by reference.

Figure 1:
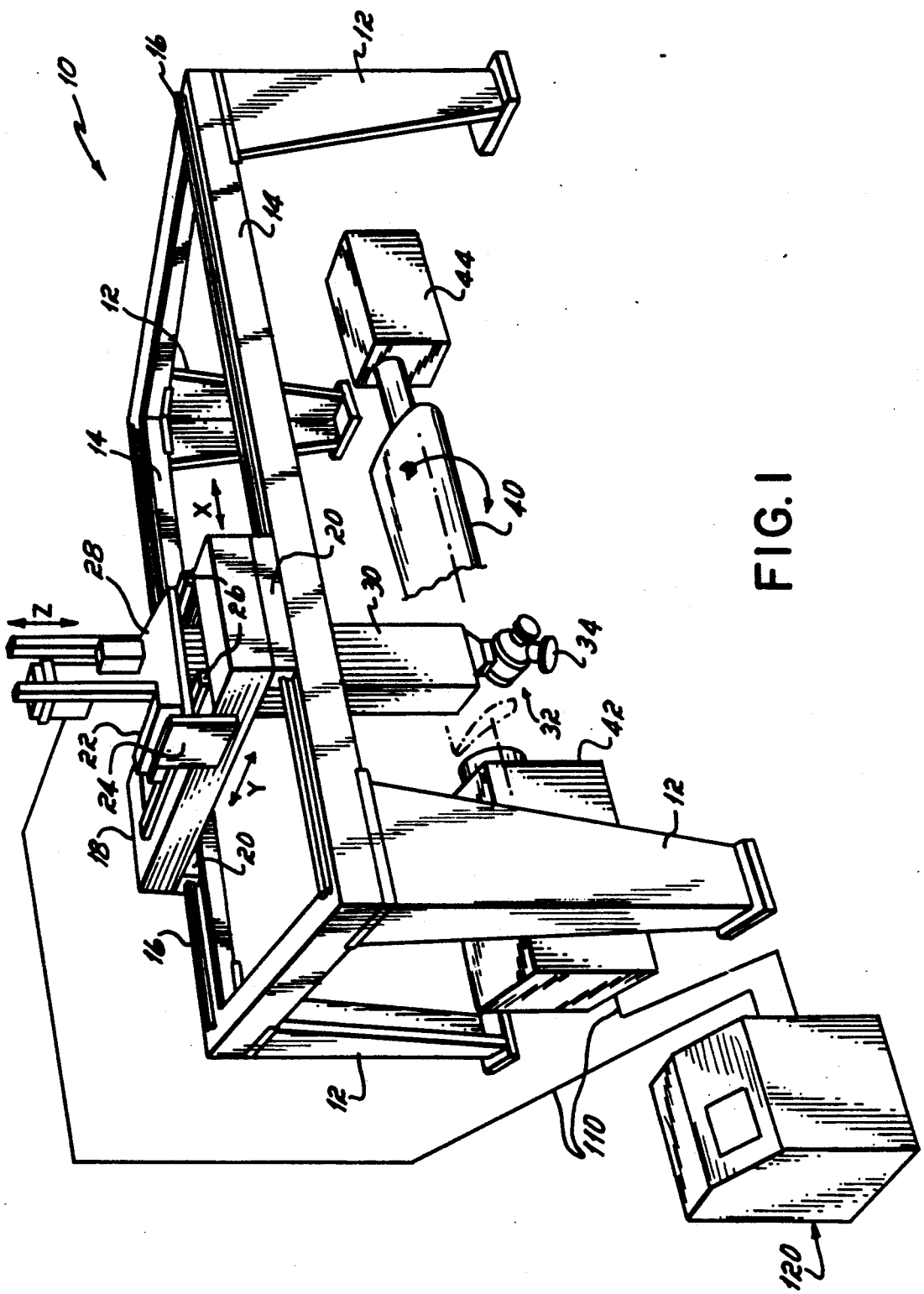
FIG. 1 is a perspective view of a first, exemplary fiber placement machine to which the present invention is applicable.

Machine 10 may be described with reference to FIGS. 1 and 2. Fiber placement machine 10 includes a plurality of vertical support stands or pylons 12 which fixedly support a pair of horizontal side members 14 to define a machine frame. Fixedly secured to each side member 14 is a way 16. A slotted, horizontal gantry or carriage 18 is slidably supported on ways 16 of side members 14 by slides 20 rigidly affixed to gantry 18. Horizontal motion of gantry 18 relative to vertical support stands 12 defines the X-axis of motion of machine 10.

A cross-slide 22 is movably supported on gantry 18. To this end, cross-slide 22 includes slides 24 (only one shown) which are slidably supported on ways 26 fixedly attached to gantry 18. Horizontal motion of the cross-slide 22 relative to gantry 18 along ways 26 is defined as the Y-axis of motion.

Cross-slide 22 provides support for a saddle 28 including a forearm 30 movable vertically within slotted gantry 18 to define the Z-axis of motion. Supported at the end of forearm 30 is a multi-axis robot wrist 32 having a tooling plate 34 to which is attached fiber placement head or tool 36 (FIG. 2) for placing a plurality of fiber tows 38 on mandrel 40 rotatably or fixedly supported by mandrel unit such as a headstock 42 and a tailstock 44. As shown schematically in FIG. 2, fiber placement head 36 may include a cut, clamp and restart unit 46 and a presser member 48 whereat fiber tows 38 are impressed onto mandrel 40 to form a component such as an air foil. An example of a suitable fiber placement head 36 is shown and described in U.S. application Ser. No. 07/445,201, entitled "Fiber Placement Head", filed Dec. 4, 1989, now U.S. Pat. No. 5,110,395, and assigned to the assignee hereof. The disclosure of said application Ser. No. 07/445,201 is incorporated herein by reference.

Included in forearm 30 is a drive mechanism (not shown) for actuating wrist 32, as is well understood. Forearm 30 and wrist 32 may be of the serial roll type shown in U.S. Pat. No. 4,068,536, assigned to the assignee hereof, and the disclosure of which is incorporated herein by reference. Wrist 32 could also be of the roll-bend-roll type. Movements of multi-axis wrist 32 define the pitch (D), yaw (E) and roll (R) axes of motion of machine 10.

Mounted to forearm 30 for movement therewith is creel assembly 52 such that pitch, yaw and roll movements of machine 10 result in relative movement between creel assembly 52 and fiber placement head 36.

Rotatably supported on axles 54 of creel assembly 52 are a plurality of spools 56 of reinforced fiber material such as graphite fibers impregnated with a matrix material such as epoxy to thus provide a plurality of fiber tows or tow pregs 38. Each tow 38 is trained over a respective tension-maintaining roller 58 such as a linearly-moveable dancer roll. Rollers 58 may be used to guide tows 38, and axles 54 of creel assembly 52 servo driven in response to tension command signals from computer control 120 to maintain tension on tows 38 as they pass from creel assembly 52 to fiber placement head 36.

Each of tows 38 is individually threaded over grooved roller 60 associated with creel assembly 52 and affixed to forearm 30 to collimate tows 38 into a band 62. Band 62 of tows is then trained around a pair of swivellable redirect roller assemblies 64, 66 to be guided between creel assembly 52 and fiber placement head 36.

Figure 2:
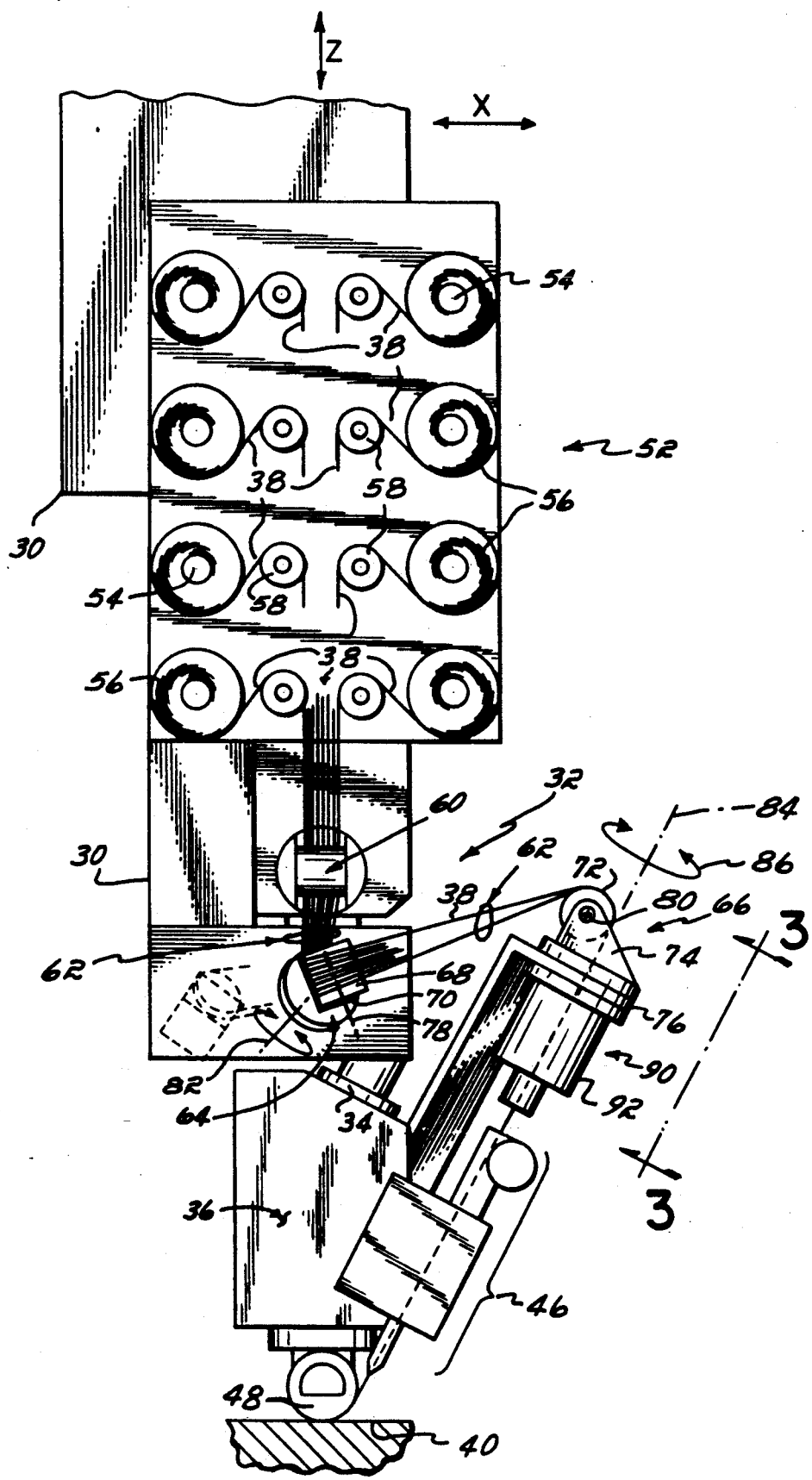
FIG. 2 is an elevational view showing the vertical forearm of the fiber placement machine of FIG. 1 supporting a fiber placement head on a robot wrist.
Figure 5:
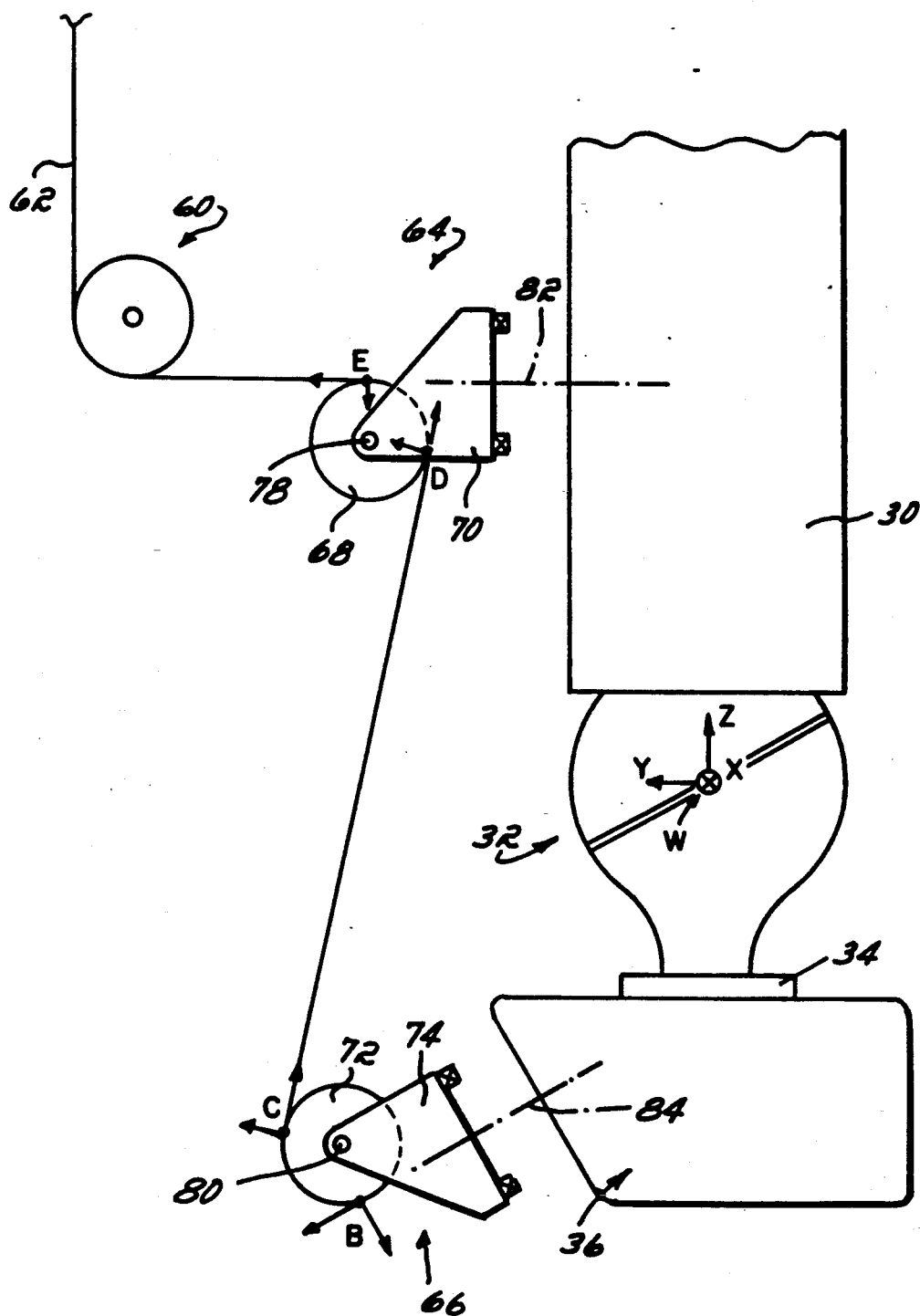
FIG. 5 is a diagrammatic view of the redirect rollers relative the robot wrist of the machine of FIG. 1.

As seen in FIGS. 2 and 5, supply side redirect roller assembly 64 associated with creel assembly 52 includes redirect roller 68 rotatably mounted to creel bracket 70, which in turn is rotatably mounted on forearm 30. Similarly, head side redirect roller assembly 66 associated with fiber placement head 36 includes redirect roller 72 rotatably mounted to outboard support bracket 74 which in turn is rotatably mounted to placement head 36 via support bracket 76. Preferably, each redirect roller 68, 72 is rotatably mounted to its respective bracket 70, 74 for rotation about a respective longitudinal axis 78, 80 as tows 38 pass thereover. Each bracket 70, 74 is in turn rotatably mounted to its respective structure such that each redirect roller assembly 64, 66 may swivel about a respective axis 82, 84 which is tangent the edge of associated roller 68, 72 (at points E and B, respectively, in FIG. 5) and perpendicular the respective longitudinal rotational axis thereof, as indicated by arrows 86 in FIG. 2.

Figure 6:
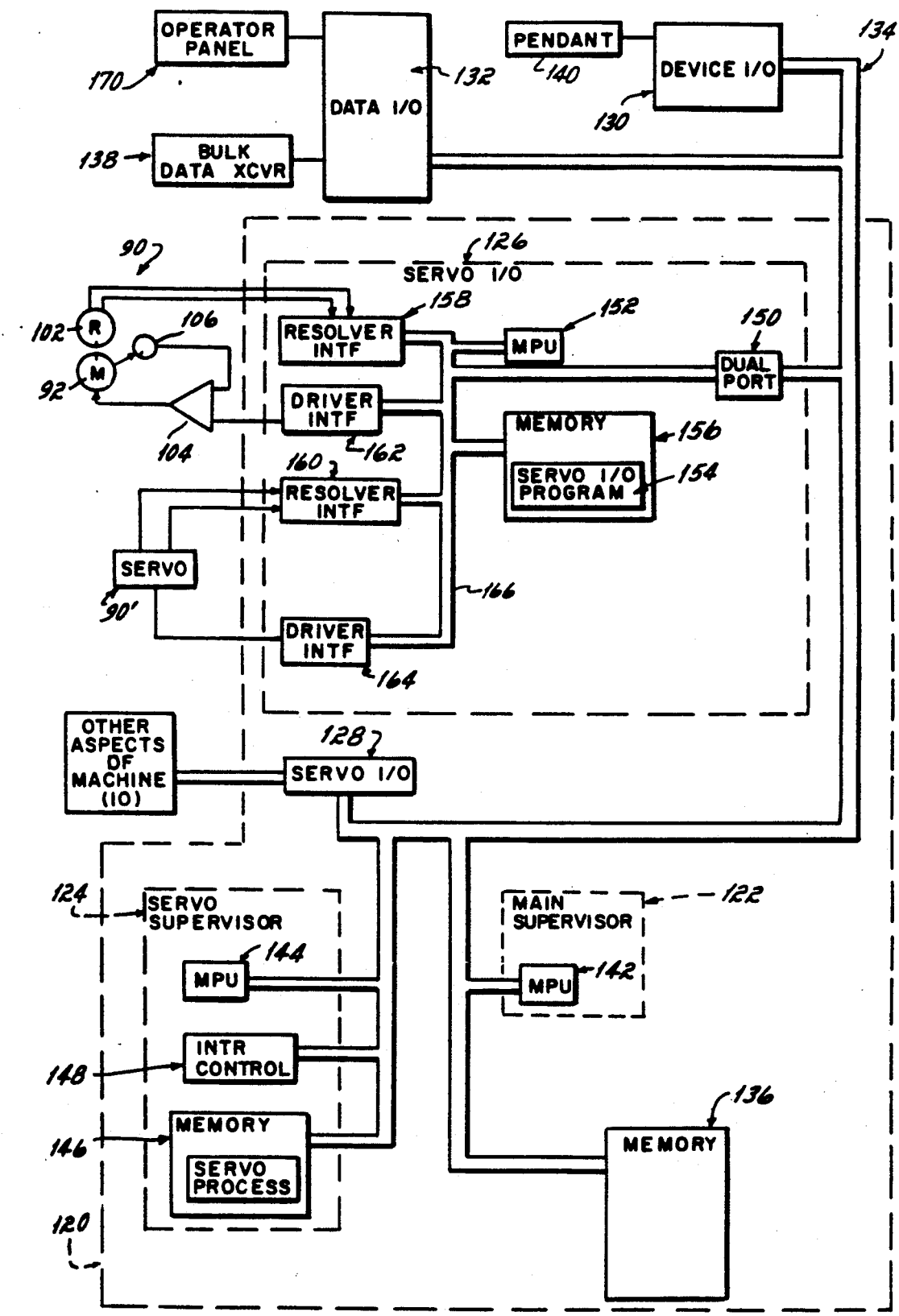
FIG. 6 is a schematic diagram of the control of FIG. 1 for providing program control of the fiber placement machine of FIG. 1.

Although not shown, redirect rollers 68, 72 may each comprise a plurality of discrete, independently rotatable, single groove roller segments such as shown in FIG. 6 in aforementioned U.S. Pat. No. 4,872,619, such that each tow 38 may pass thereover at a rate independent of the other tows 38 in the band 62.

As will be appreciated, as placement head 36 moves about in space, band 62 of fiber tows 38 will change orientation, often quite rapidly, and may even twist. It is desirable that band 62 exit supply side redirect roller assembly 64 at point D (FIG. 5) and enter head side redirect roller assembly 66 at point C (FIG. 5) such that the longitudinal axis of each tow 38 is perpendicular the longitudinal axis of rotation (78 or 80) of the respective rollers thereof. Stated differently, the width of band 62 would be parallel the longitudinal axis of the redirect roller 68 as it departs from roller 68 and as it enters onto roller 72. If the tension on tows 38 is very high and tows 38 are not very tacky, tension alone may coerce brackets 70, 74 to swivel sufficiently as placement head 36 moves about to maintain such alignment.

Figure 4:
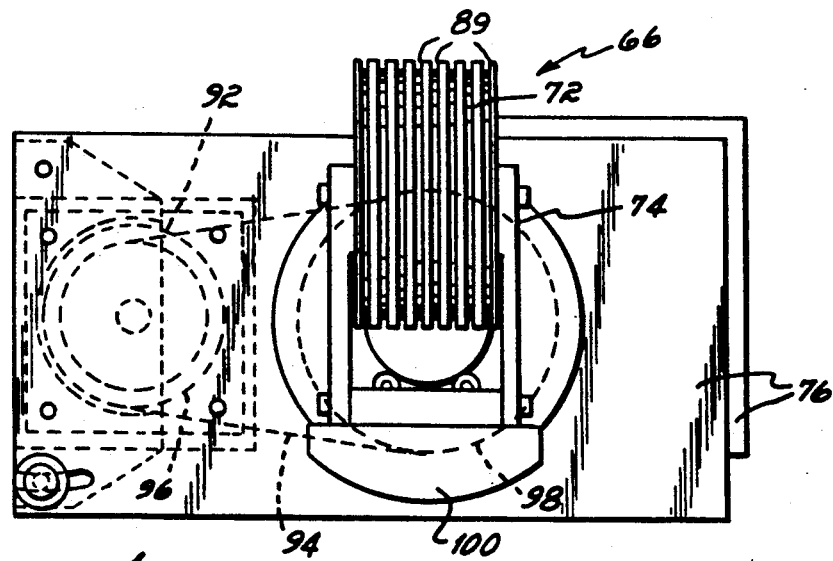
FIG. 4 is an end view showing the redirect roller servo drive taken along line 4—4 of FIG. 3.
Figure 3:
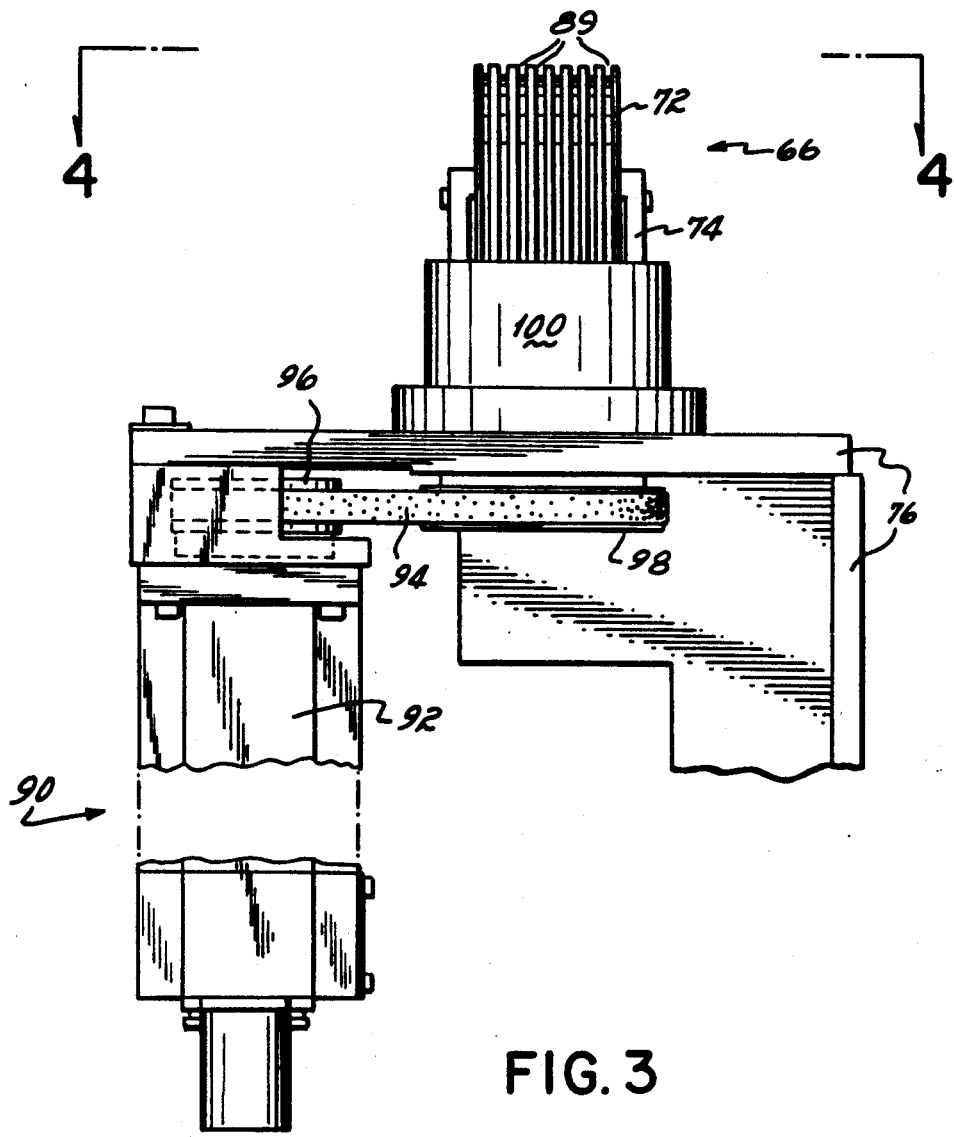
FIG. 3 is a view showing a redirect roller servo drive taken along line 3—3 of FIG. 2.

Unfortunately, the brackets may not always swivel to the correct angular orientation, especially if tow tension is low or the tow pregs are tacky. If the redirect rollers are not properly swivelled, one or more of the tows may be damaged or the machine shut down. For example, if either of redirect rollers 68, 72 is not swivelled sufficiently, one or more of tows 38 may rub against each other or an edge 89 (FIG. 4) of a roller or may even come away from the roller altogether.

To reduce the likelihood of such problems, head redirect roller assembly 66 may be provided with a servo motor assembly 90 by which to drivingly swivel the redirect roller assembly in response to swivel control signals from control 120 as will be described below. Servo motor assembly 90 may include servo motor 92 (such as shown supported on bracket 76 coupled to placement head 36) to drivingly swivel the redirect roller assembly via belt 94 coupled to pulleys 96, 98 mounted to motor 90 and bracket 74. A balance counterweight 100 may also be coupled to the bracket.

Referring to FIG. 6, servo motor assembly 90 preferably includes a resolver 102 by which the angular swivel of bracket 74 may be monitored by control 120. Servo motor assembly 90 may also include a conventional velocity feedback loop comprising a drive amplifier 104 and a tachometer 106. As is conventional, the output of tachometer 106 may be fed back to drive amplifier 104 for a velocity feedback loop. Drive amplifier 104 preferably includes a gain adjustment (not shown) to manually set the gain thereof so that a predetermined swivel control signal from control 120 will cause swivel of the redirect roller assembly at a predetermined velocity. Drive amplifier 104 further preferably includes a balance adjust (not shown) by which to manually set the bias therein so that a swivel control signal of zero volts from control 120 will result in an angular velocity of zero of the redirect roller bracket. Although servo motor assembly 90 associated with head redirect roller assembly 66 has been described in some detail, it is to be understood that a similar servo motor assembly 90' may be provided to cause supply side redirect roller assembly 64 to swivel as desired.

Control 120 is utilized to monitor and control motion and other functions of machine 10 and is implemented as a digital microprocessor-based computer system. Hence, the various command signals generated within control 120 are implemented as digital words. Control 120 includes a plurality of independent modules including main supervisor (or block processor) 122, servo supervisor 124, redirect roller, servo input/output module (servo I/O) 126, other servo I/O modules represented as at 128, device input/output module 130, and data input/output module 132, all connected by a common bus 134. Each of these modules typically includes a microprocessor and associated peripheral devices and memory as required for the function of the module such as the 80186 microprocessor and peripheral devices available from Intel Corporation.

Control 120 also includes a main memory 136 in which is stored the application program(s) in blocks containing world coordinates (X, Y, Z, D, E and R, for example) relating the centerpoint W of wrist 32 (FIG. 5) to the machine frame and, preferably, tension commands for creel assembly 52, all of which collectively define the overall cycle of operation of machine 10 by which to construct the component on mandrel 40. The application program stored within memory 136 may be produced on independent equipment and loaded through the data input/output module 132 from a bulk data transceiver 138. A pendant 140 is coupled to bus 134 by device I/O 130 by which to manually control machine 10.

The application program stored in memory 136 is executed by microprocessor unit 142 of main supervisor 122 until the end of the program has been reached, i.e., all the moves of placement head 36 have been completed and the component constructed. To this end, main supervisor 122 generates span and control signals (see FIG. 7A) for each axis of movement of machine 10, which signals are utilized by servo supervisor 124 to repetitively generate incremental change in position command signals by which to control operation of the servo control modules as will be explained. Servo I/O 128 may actually be several such modules, all of which collectively communicate with the various drives, actuators, sensors or resolvers, and other aspects of machine 10 which cooperate in response to command signals from servo supervisor 124 to cause head 38 to apply fiber tows 36 to mandrel 40 to construct components.

Servo supervisor 124 includes a local microprocessor 144 executing servo processing programs (see FIGS. 7B and 7C) stored within local memory 146 and an interrupt control 148 responsive to interrupts from a master servo I/O (for example, one of the servo I/O's contained within servo I/O 128 may be selected as the master servo I/O). In response to an interrupt from the master servo I/O, such as every 10 milliseconds, change in position command signals are determined by servo supervisor 124 for each of the axes and distributed to the servo I/O's 128. Servo supervisor 124 also generates swivel command signals (SCMD) which are coupled to servo I/O 126 for generation of swivel control signals to cause the appropriate swivelling of redirect roller assembly 66 and/or assembly 64, as will subsequently be described.

Connection between module 126 and common bus 134 is achieved through dual port memory device 150. Data to be exchanged between module 126 and other modules within the system is transferred asynchronously through dual port memory device 150. Local processor 152 executes servo input/output programs 154 (see FIG. 7D) stored within local memory 156 to cause the appropriate swivel of the redirect roller assembly Local processor 152 communicates with dual port memory device 150, and memory 156, resolver interfaces 158, 160 and driver interfaces 162, 164 over local bus 166 by which to monitor the swivel angle of the redirect roller assemblies and to generate swivel control signals which drivingly swivel the redirect roller assemblies in response to SCMD generated by servo supervisor 124. To this end, resolver 102 of servo motor assembly 90 provides position information through resolver interface 158 which information is utilized by microprocessor 152 along with SCMD in dual port memory device 150 to generate digital velocity command signals (VCMD) to driver interface 162, which converts VCMD into analog swivel control signals to be coupled through drive amplifier 104 to motor 92 and, thus, drivingly swivel bracket 74 of head side redirect roller assembly 66. A similar arrangement may be provided with respect to servo motor assembly 90' associated with supply side redirect roller assembly 64 by way of resolver interface 160 and driver interface 164. For purposes of explanation, control of head redirect roller assembly 66 will be described, it being understood that a similar arrangement may be provided within servo I/O 126 for drivingly swivelling supply side redirect roller assembly 64.

Figure 7A:
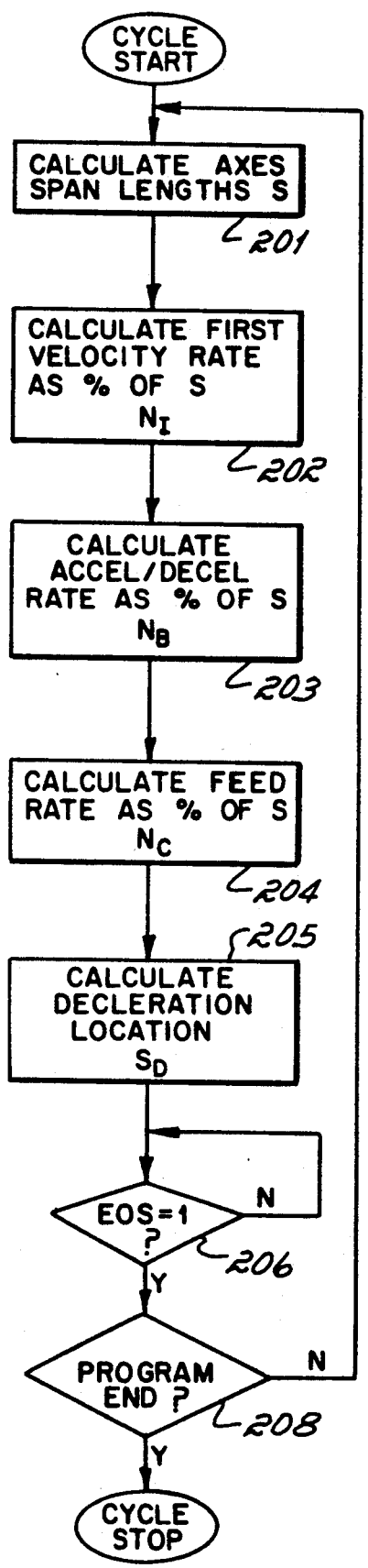
FIGS. 7A-7D are flow charts of the operation of the control of FIG. 6 for computing the swivel angles of the redirect rollers in accordance with the principles of the present invention.
Figure 7D:
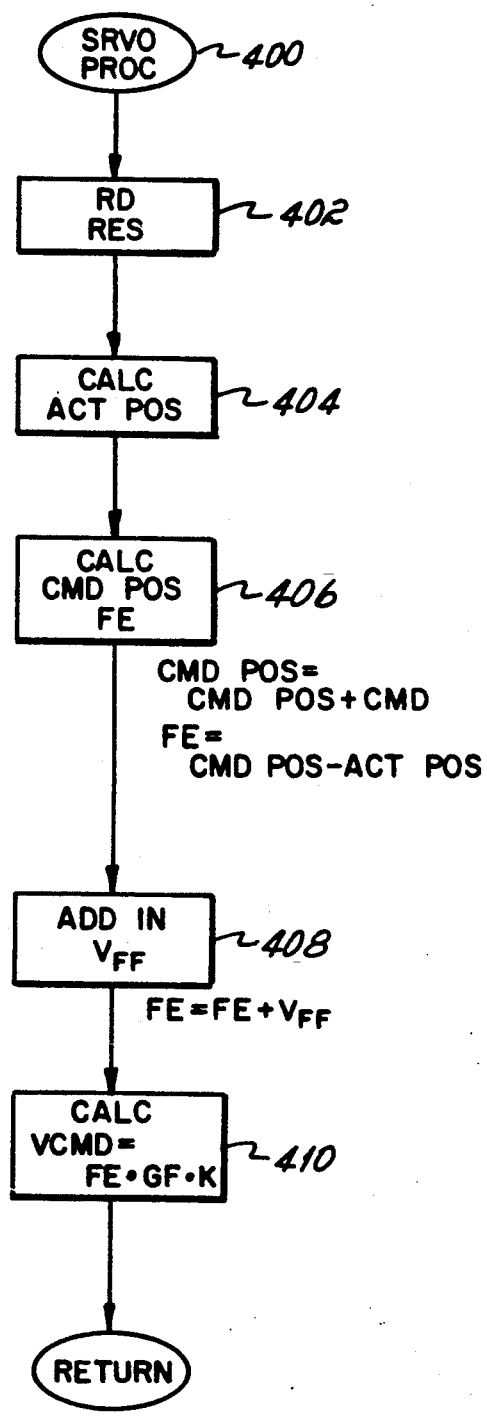
Figure 7B:
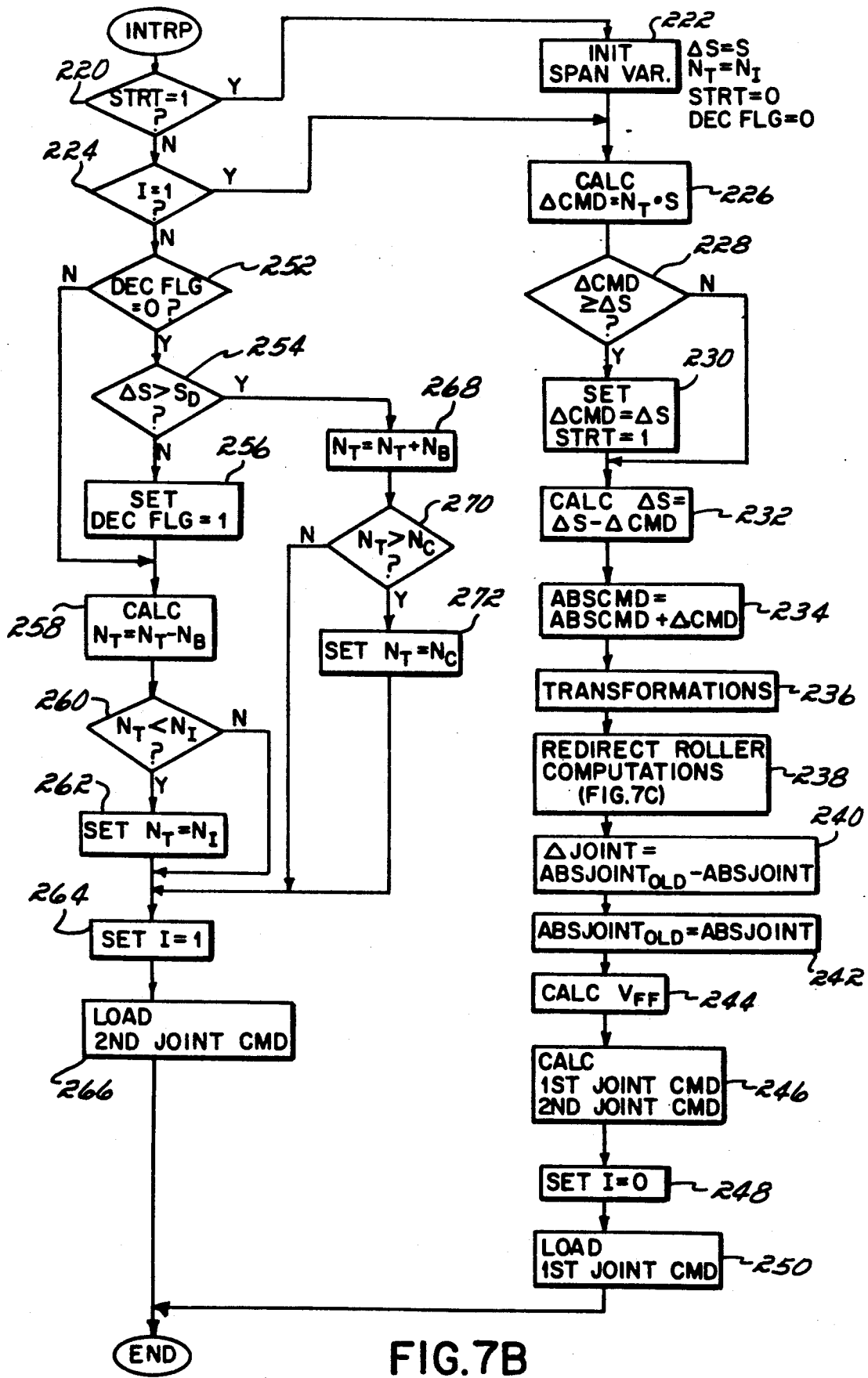
Figure 7C:
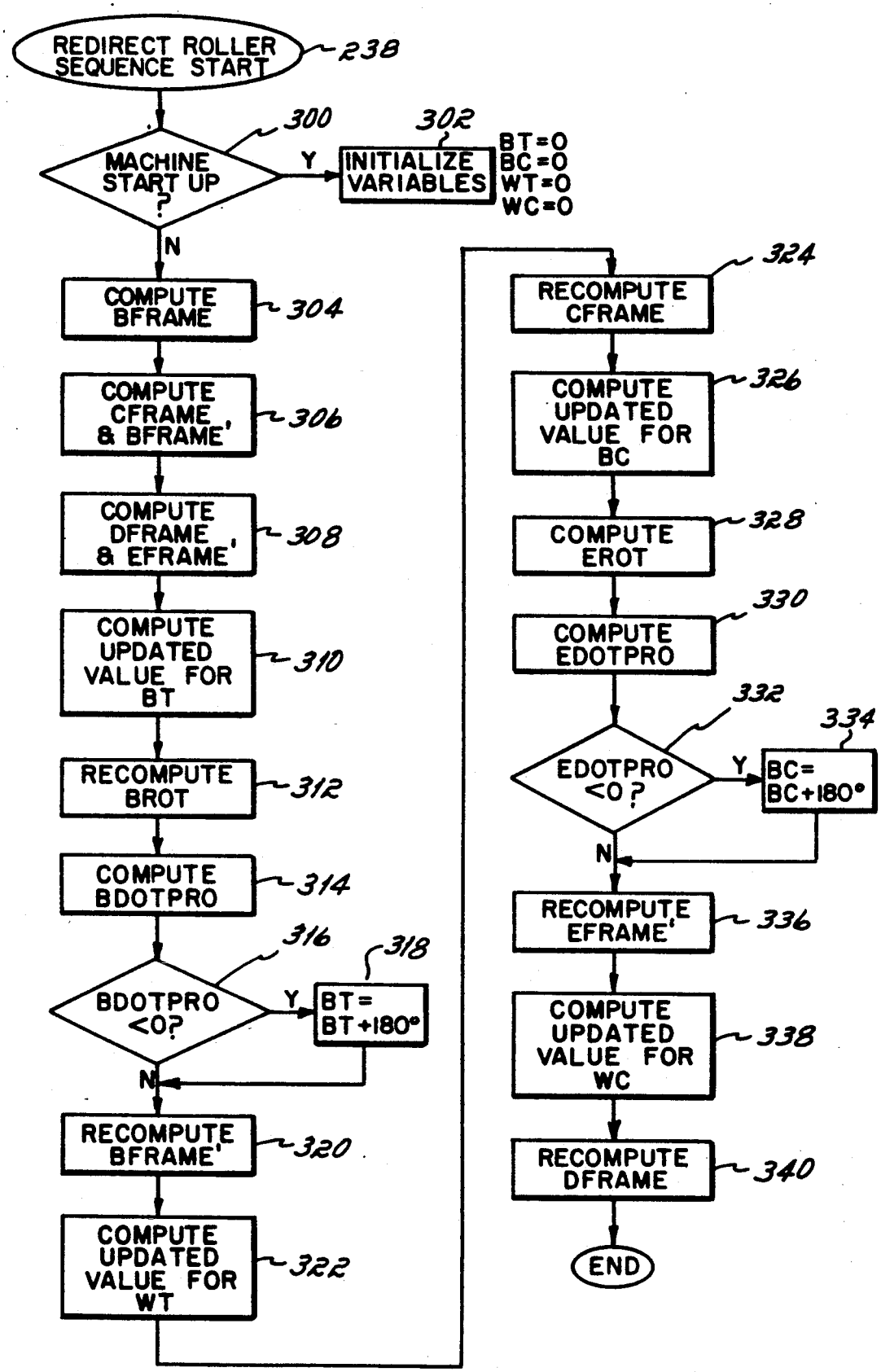

The control procedures for affecting control of redirect roller assembly 66 during operation of the application program stored in memory 136 shall be described with reference to the flow charts. The flow chart of FIG. 7A illustrates the processing steps executed by main supervisor 122 to produce span and control signals in accordance with the application program defining locations and functions stored in memory 136. The flow chart of FIG. 7B illustrates the processing steps executed by servo supervisor 124 to generate change in position command signals for positioning head 36 from the span and control signals produced by main supervisor 122. The flow chart of FIG. 7C illustrates additional processing steps executed by servo supervisor 124 to generate swivel command signals (SCMD) to be utilized by servo I/O 126 to drivingly swivel the redirect roller assembly in accordance with the principles of the present invention. Finally, the flow chart of FIG. 7D illustrates the processing steps executed by microprocessor 152 of servo I/O 126 to automatically position the redirect roller assembly in response to SCMD whereby to compensate for commanded moves of head 36 in accordance with the principles of the present invention.

Processing of the procedural steps of the flow chart of FIG. 7A is initiated by a cycle start signal produced in response to the operation of a cycle start push button (not shown) on operator panel 170. At process step 201 data are computed which are required for the interpolation of intermediate points along a linear path, for example, between two successive programmed locations of the tool (tow application head 36) in world coordinates. The span length S in each axis (X, Y, Z, D, E and R, for example) is determined from the world coordinate data of these locations. A pre-programmed velocity or feed rate is recalled from memory 136 and, in conjunction with the span length signal S for each axis, additional velocity control signals are calculated at process steps 202-205 as follows:

$N_I$ = the percent of S which the member is to move in the selected axis during the first and last interpolation intervals defining a step velocity change;

$N_B$ = the percent of S by which the interpolation incremental distance is to change;

$N_C$ = the percent of S which the member is to move during each interpolation interval in the constant velocity mode; and $S_D$ = the distance from the end of the span at which deceleration must begin from the programmed velocity.

These values for S, $N_I$, $N_B$, $N_C$ and $S_D$ are stored in a buffer in memory 136 for access by servo supervisor 124 during the servo supervisor's execution of the span.

After process steps 201-205 have been executed, the overall cycle of operation executed by the main supervisor is controlled by the completion of motion as indicated by the end of span signal detected at decision step 206. If the servo supervisor has not set the end of span flag, herein referred to as EOS, the sequence may idle at process step 206 until the end of the span is reached (EOS = 1). Preferably, the sequence of steps 201 to 205 will be executed for the next span before the end of the previous span is reached in an effort to pre-process information to generate the next set of span and control signals which may then be loaded into a buffer.

Following completion of interpolation, a decision is made at process step 208 to determine whether or not the location defining the end of the current span corresponds to the end of the program stored in memory 136. If not, execution of the control procedure of FIG. 7A continues to process step 201 to initialize data for the next programmed span. Execution of the stored program of motion continues in this fashion until it is determined at decision step 208 that the last location of the program has been reached. Thereafter, the fiber placement program execution ceases, but the entire program may be re-executed by operator intervention.

The axis command signal processing of servo supervisor 124 shall be described with reference to FIG. 7B. Periodically, in response to an interrupt signal generated by the master servo I/O, the span increment interpolation procedure of FIG. 7B is executed for each axis to output change in position and other servo command signals to the servo I/O modules 128.

At decision step 220 it is determined whether the current execution of the span increment interpolation procedure is the first execution for the current span. If it is, span variables are initialized at process step 222 in preparation for interpolation of the first increment of the current span. The span length remaining $\Delta S$ is initialized to the axis span length S; the current value of the increment factor $N_T$ is initialized to the step velocity factor $N_I$; the first execution flag STRT is initialized to 0; and the deceleration flag is initialized to 0. If the current execution of the span increment interpolation procedure is not the first for the span, process step 222 is skipped. At decision step 224 it is determined whether the iteration toggle I is set to 1 indicating a first iteration for an interpolated change in commanded position $\Delta CMD$. Each change in commanded position $\Delta CMD$ is processed in two iterations, and each iteration outputs half of the total change in commanded position to the appropriate servo I/O. The interpolation procedure maintains a record of progress in the current span as the magnitude of the span length remaining $\Delta S$. This magnitude is reduced once for each pair of iterations.

At process step 226, the magnitude of the change of commanded position ($\Delta CMD$) for the next pair of iterations is calculated as the product of the axis span length S and current value of the increment factor $N_T$. During the first iteration of the first execution of the procedure, the increment factor $N_T$ has a value equal to the step velocity factor $N_I$ calculated by the pre-interpolation procedure at process step 202. The magnitude of the change in commanded position $\Delta CMD$ is compared to the current magnitude of the remaining span length $\Delta S$ at decision step 228. If the change in commanded position $\Delta CMD$ is greater than or equal to the remaining span length $\Delta S$, the change in commanded position $\Delta CMD$ is set equal to the remaining span length $\Delta S$ at process step 230. Since this condition corresponds to interpolation of the last span increment of the current span, the first flag is set true and the end of span flag EOS is set true (= 1). Process step 230 is skipped if the change in commanded position $\Delta CMD$ is less than the remaining span length $\Delta S$.

At process step 232, a new value for the remaining span length $\Delta S$ is calculated by subtracting the magnitude of the change in commanded position $\Delta CMD$ from the previous value of the remaining span length $\Delta S$. At process step 234, the absolute commanded position (ABSCMD) in the axis of interest is calculated equal to the sum of the current ABSCMD and $\Delta CMD$. At step 236, the ABSCMD commands calculated for each of the X, Y, Z, pitch, yaw and roll axes are transformed into absolute joint commands (ABSJOINT) in known fashion whereby each joint of machine 10 may be commanded so that presser member 48 will move to the absolute commanded position in the world coordinate axis system as discussed in U.S. Pat. Nos. 3,920,972 and 3,909,600 assigned to the assignee hereof, the disclosures of which are incorporated herein by reference. At step 238, the ABSCMD data for pitch, yaw and roll from step 234 are utilized to compute the absolute joint commands for the redirect rollers as will subsequently be described.

The sequence continues to step 240 whereat the change in joint position (ΔJOINT) command is calculated for each axis equal to the difference between the absolute joint command calculated on the previous pass of the sequence of FIG. 7B (ABSJOINT$_{OLD}$) and the present absolute joint command (ABSJOINT) for each axis. Then, at step 242, ABSJOINT$_{OLD}$ is set equal to the current ABSJOINT for use on the next iteration through the sequence of FIG. 7B. At step 244, a velocity feed forward component (V$_{FF}$) is calculated as follows:

$$V_{FF} = \frac{(JOINT)(6)}{GF} \quad (1)$$

wherein GF is a software gain constant which will be described in connection with step 410 of FIG. 7D.

The sequence then proceeds to process step 246 whereat the first and second iteration change in joint position commands, 1st JOINT CMD and 2nd JOINT CMD, are calculated. These commands are referred to here as # JOINT CMD (wherein # refers to 1st or 2nd as appropriate). 1st JOINT CMD is calculated by dividing ΔJOINT by 2, and 2nd JOINT CMD is equal to the difference of ΔJOINT and 1st JOINT CMD. This calculation self corrects for round off errors in the division of ΔJOINT. At process step 248, the iteration toggle is set to 0 in preparation for the next iteration. At process step 250, the first iteration change in position command 1st JOINT CMD is loaded into the appropriate servo I/O module. In the case of the redirect roller assemblies, # JOINT CMD is referred to as a swivel command signal (SCMD) and is placed into dual port memory 150 of servo I/O 126 for control of redirect roller assembly swivel angle as will be described hereinafter.

The second iteration change in position command 2nd JOINT CMD generation begins with determination of a 0 value of I detected at decision step 224. On the occurrence of the next interrupt, after the first iteration, the value of the iteration toggle flag I will be 0 and the execution of the interpolation procedure will continue at decision step 252. There, it is determined whether the deceleration flag has been set true, indicating that interpolation has progressed to the deceleration point S$_D$ or beyond. If not, execution continues at decision step 254 where it is determined whether the remaining span length ΔS is more than the deceleration distance S$_D$ calculated in the preinterpolation procedure at process step 205. If the remaining span length ΔS is not more than the deceleration distance S$_D$, execution continues at process step 256 where the deceleration flag is set true and the constant velocity flag is set false. Thereafter, a new value for the increment factor N$_T$ is calculated at process step 258 to decrease the magnitude of the increment factor N$_T$ by the acceleration/deceleration incremental adjustment N$_B$. At decision step 260 it is determined whether the new value of the increment factor N$_T$ is less than the step velocity factor N$_I$. If it is, the interpolation factor N$_T$ is set equal to the step velocity factor N$_I$ at process step 262. Otherwise, process step 262 is skipped. Thereafter, at process step 264, the iteration toggle flag I is set equal to 1 in preparation for the next iteration. At process step 266, the second iteration change in joint position command 2nd JOINT CMD is loaded into the appropriate servo I/O module. It will be appreciated that the new value of the increment factor N$_T$ will result in the interpolation of a smaller increment command ΔJOINT with the next execution of the increment interpolation procedure, thus effecting a decrease of the velocity of the affected machine member.

If interpolation had not progressed to the deceleration point, execution from decision step 254 would proceed to step 268 where the magnitude of the increment factor N$_T$ is increased by the acceleration/deceleration factor N$_B$. At decision step 270, the new value of the increment factor N$_T$ is compared to the constant velocity factor N$_C$ calculated during execution of the preinterpolation procedure at process step 204. If the increment factor N$_T$ is greater than the constant velocity factor N$_C$, it is set equal the constant velocity factor N$_C$ at process step 272. Otherwise, process step 272 is skipped.

While the foregoing has been described with respect to change in joint position signals as if for only one axis, the sequence occurs concurrently for each axis. Hence, the various servo I/O's 128 will receive respective interpolation change in joint position commands (# JOINT CMD) for the appropriate axes almost simultaneously whereupon movement in all axes will be coordinated. That is, movement in each axis will accelerate to a constant velocity so that the respective constant velocity or feed rate is attained for each axis at the same time. Deceleration is to likewise occur simultaneously. Main supervisor 122 thus calculates the various values of span and control signals S, N$_I$, N$_B$, N$_C$, and S$_D$ for each axis accordingly.

Additionally, the span length S (or, alternatively, angle of rotation) may be positive or negative indicating forward or reverse motion of the member in its respective axis. As a consequence, the iteration change in joint position signals (# JOINT CMD) will also be either positive or negative to indicate the direction of movement.

It will be recalled that the user (not shown) inputs data in world coordinates and control 120 develops from those coordinates absolute joint commands for the various components of the machine. For purposes of positioning the redirect roller assembly of machine 10 of FIG. 1, movement of head 36 relative creel assembly 52 need be considered. To this end, only the absolute commands of pitch (D), yaw (E) and roll (R) for wrist 32 are necessary, and may be seen as related to the local coordinate frame (local x, local y and local z axes) at wrist centerpoint W with the local x-axis pointing into the page, as seen in FIG. 5. With knowledge of the wrist centerpoint W relative the creel assembly 52, it is possible to compute the appropriate swivel angles of redirect roller assemblies 64, 66 so as to maintain fiber band 62 in alignment as head 36 moves under command of control 120. The sequence of FIG. 7C describes an implementation of such computation.

Before explaining the procedure of FIG. 7C, it is helpful to define some terms as follows:

| Term | Definition |
|---|---|
| 1. BFRAME | 4 by 4 orientation matrix relating fiber band 62 coordinate frame (local x, y and z axes) at point B to wrist centerpoint W, wherein point B lies on rotation axis 84 of head side redirect roller bracket 74 and on the circumference of head redirect roller 72. |
| 2. EFRAME | 4 by 4 orientation matrix relating fiber band 62 coordinate frame (local x, y and z axes) at point E to wrist centerpoint W, wherein point E lies on rotation axis 82 of supply side redirect roller bracket 70 and on the circumference of supply redirect roller 68. |
| 3. CFRAME | 4 by 4 orientation matrix relating fiber band 62 coordinate frame (local x, y and z axes) at point C to wrist centerpoint W, wherein point C lies along the circumference of head redirect roller 72 at the center of the line of contact between fiber band 62 and roller 72. |
| 4. DFRAME | 4 by 4 orientation matrix relating fiber band 62 coordinate frame (local x, y and z axes) at point D to wrist centerpoint W, wherein point D lies along the circumference of supply redirect roller 68 at the center of the line of departure between fiber band 62 and roller 68. |

Each (—)FRAME orientation matrix above may take the form:

$$(-)\text{FRAME} = \begin{bmatrix} n_x & o_x & \gamma_x & \rho_x \\ n_y & o_y & \gamma_y & \rho_y \\ n_z & o_z & \gamma_z & \rho_z \\ o & o & o & 1 \end{bmatrix} \quad (2)$$

wherein $n_x$, $n_y$ and $n_z$ are x, y and z coordinates, respectively, of a unit vector along local axis x at point (—); $o_x$, $o_y$ and $o_z$ are x, y and z coordinates, respectively, of a unit vector along local axis y at point (—); $\gamma_x$, $\gamma_y$ and $\gamma_z$ are x, y and z coordinates, respectively, of a unit vector along local axis z at point (—); and $\rho_x$, $\rho_y$ and $\rho_z$ is a position vector pointing from the global frame origin (at wrist centerpoint W) to the local coordinate origin at point (—).

| | | |
|---|---|---|
| 5. | BTRANS | 4 by 4 transformation matrix of point B position with respect to placement head 36 when all angles of wrist 32 (D, E and R) are set equal to zero. |
| 6. | BT | Swivel angle of head side bracket 74. |
| 7. | BC | Swivel angle of supply side bracket 70. |
| 8. | WT | Wrap angle of fiber band 62 about head side roller 72 between points B and C. |
| 9. | WC | Wrap angle of fiber band 62 about supply side roller 68 between points D and E. |
| 10. | $ROT_{x\phi}$ | 4 by 4 rotation matrix about a local axis x by angle $\phi$ wherein |

$$ROT_{x\phi} = \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \quad (3)$$

| | | |
|---|---|---|
| 11. | $ROT_{y\phi}$ | 4 by 4 rotation matrix about a local axis y by angle $\phi$ wherein |

$$ROT_{y\phi} = \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix} \quad (4)$$

| | | |
|---|---|---|
| 12. | $ROT_{z\phi}$ | 4 by 4 rotation matrix about a local axis z by angle $\phi$ wherein |

$$ROT_{z\phi} = \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix} \quad (5)$$

| | | |
|---|---|---|
| 13. | $TR_{zL}$ | 4 by 4 translation matrix along a local axis z by dimension L wherein |

$$TR_{zL} = \begin{bmatrix} 1 & 0 & 0 & 0 \\ 0 & 1 & 0 & 0 \\ 0 & 0 & 1 & L \\ 0 & 0 & 0 & 1 \end{bmatrix} \quad (6)$$

Turning now to FIG. 7C, the sequence of operation for computing the swivel command (i.e., absolute joint) for the redirect roller assembly (step 238 in FIG. 7B) will now be described. The redirect roller sequence begins at step 238 and proceeds to decision step 300 whereat the sequence branches to initialization step 302 if machine 10 is at start up, i.e., tows 38 are first being applied. At step 302, variables BT, BC, WT and WC are all set equal to zero. If machine 10 is not at start up at step 300, or step 302 has been performed, the sequence proceeds to step 304 whereat BFRAME is computed by multiplying BTRANS with the rotation matrices about local axis z of yaw angle (E), about local axis y by pitch angle less 90° (D-90°), and about local axis x by roll angle (R), as follows:

$$BFRAME = (ROT_{zE})(ROT_{y(D-90°)})(ROT_{xR})(BTRANS) \quad (7)$$

wherein BTRANS is a constant based upon the dimensional relationship between point B and wrist center W for machine 10 with a unit vector [0.819 0.0 0.573] for fiber band 62 at local x with respect to the global frame; with a unit vector [0 1 0] for fiber band 62 at local y with respect to the global frame; with a unit vector [−0.573 0.0 0.819] for fiber band 62 at local z with respect to the global frame; and with the position of point B with respect to the global frame being a vector [17.10 0.0 14.10] such that $$BTRANS = \begin{bmatrix} 0.819 & 0 & -0.573 & 17.10 \\ 0 & 1 & 0 & 0 \\ 0.573 & 0 & 0.819 & 14.10 \\ 0 & 0 & 0 & 1 \end{bmatrix} \quad (8)$$

The result of formula (7) will have the solution for the BFRAME matrix as shown in Table I.

The sequence of FIG. 7C then proceeds to step 306 whereat CFRAME is computed by multiplying BFRAME with the rotation matrices about local axis x by angle BT and about local axis y by angle WT and with the translation matrices along the z axis by the positive and the negative values of the diameter ($RD_H$) of head side redirect roller 72 according to the formula:

$$CFRAME = (BFRAME')(ROX_{x(WT)})(TR_{x(RDH)}) \quad (9)$$

wherein $$BFRAME' = (BFRAME)(ROT_{x(BT)})(TR_{x(-RDH)}) \quad (10)$$

The result of formula (10) will have the solution for the BFRAME' matrix shown in Table I. The result of formula (9) will likewise have the solution for the CFRAME matrix shown in Table I.

The sequence proceeds to step 308 whereat DFRAME is computed by multiplying EFRAME with the rotation matrices about local x by angle BC and about local y by angle WC and with translation matrices along the z axis by the positive and negative valves of the diameter ($RD_S$) of the supply side redirect roller 68 according to the formula:

$$DFRAME = (EFRAME')(ROT_{x(WC)})(TR_{x(-RDS)}) \quad (11)$$

wherein $$EFRAME' = (EFRAME)(ROT_{x(BC)})(TR_{x(RDS)}) \quad (12)$$

The result of formula (12) will have the solution for the EFRAME' matrix shown in Table I. The result of formula (11) will likewise have the solution for the DFRAME matrix shown in Table I.

The EFRAME matrix is a constant based upon the relationship between point E and wrist center W for machine 10 with a unit vector [0 1 0] for fiber band 62 at local x with respect to the global frame; with a unit vector [1 0 0] for fiber band 62 at local y with respect to the global frame; with a unit vector [0 0 −1] for fiber band 62 at local z with respect to the global frame; and with the position of point E with respect to the global frame being a vector [0 9.74 13.39] such that $$EFRAME = \begin{bmatrix} E_{11} & E_{12} & E_{13} & E_{14} \\ E_{21} & E_{22} & E_{23} & E_{24} \\ E_{31} & E_{32} & E_{33} & E_{34} \\ 0 & 0 & 0 & 1 \end{bmatrix} = \begin{bmatrix} 0 & 1 & 0 & 0 \\ 1 & 0 & 0 & 9.74 \\ 0 & 0 & -1 & 13.39 \\ 0 & 0 & 0 & 1 \end{bmatrix} \quad (13)$$

The sequence of FIG. 7C then proceeds to step 310 whereat an updated value for the swivel angle BT of bracket 74 of head redirect roller assembly 66 is computed such that a plane containing point B, the centerpoint of axis 80 of roller 72, and point D is perpendicular a vector for fiber band 62. The updated value of angle BT is found by setting the cross product of the fiber band vector and the vector from point D to point B equal to zero such that:

$$BT = \tan^{-1} \frac{-[B_{12}(B_{14} - DP(1)) + B_{22}(B_{24} - DP(2)) + B_{32}(B_{34} - DP(3))]}{B_{13}(B_{14} - DP(1)) + B_{23}(B_{24} - DP(2)) + B_{33}(B_{34} - DP(3))} \quad (14)$$

where the values $B_{ab}$ are from the BFRAME matrix computed at step 304 and where the point D position vector is [DP(1) DP(2) DP(3)] utilizing the [$p_x$ $p_y$ $p_z$] vector values from the DFRAME matrix computed at step 308. The sequence then proceeds to determine whether angle BT is such that head redirect roller 72 would point toward supply redirect roller 68. To this end, a value of BROT is computed at step 312 such that $$BROT = (BFRAME)(ROT_{x(BT)}) \quad (15)$$

with the newly calculated value for BT. The result of formula (15) will have the solution for the BROT matrix shown in Table I. Thereafter, the dot product (BDOTPRO) between the local z vector at B and the vector pointing from point E to point B is computed at step 314 based upon the $\rho$ vector of the constant EFRAME matrix, and the $\gamma$ and $\rho$ vectors of the BROT matrix as follows:

$$BDOTPRO = (-B_{12} \sin BT + B_{13} \cos BT)(B_{14} - 0) + (-B_{22} \sin BT + B_{23} \cos BT)(B_{24} - 9.74) + (-B_{32} \sin BT + B_{33} \cos BT)(B_{34} - 13.39) \quad (16)$$

The computed value of BDOTPRO is then tested at decision step 316 and if it is less than zero, redirect roller 72 would be pointing the wrong direction, so BT is corrected by adding 180° at step 318, thus:

$$BT = BT + 180° \quad (17)$$

If BDOTPRO is not less than zero at step 316, or after correcting BT at step 318, an updated value of WT is computed by first recomputing BFRAME' at step 320 by recomputing formula (10) with the newly computed value of BT and then computing WT at step 322 in a two step iteration wherein the following formula is performed twice:

$$WT = WT - \frac{(\sin WT)(C1) + (\cos WT)(C2) + RD_H}{(\cos WT)(C1) - (\sin WT)(C2)} \quad (18)$$

with the value for WT computed after performing formula (18) the first time being used to compute a final value of WT the second time formula (18) is performed so as to approximate two loops through a Newton Raphson search; and wherein $$C1 = B_{11}'(B_{14}' - DP(1)) + B_{21}'(B_{24}' - DP(2)) + B_{31}'(B_{34}' - DP(2)) \quad (19)$$

and $$C2 = B_{13}'(B_{14}' - DP(1)) + B_{23}'(B_{24}' - DP(2)) + B_{33}'(B_{34}' - DP(2)) \quad (20)$$

from the newly computed BFRAME' matrix and the $\rho$ vector of the DFRAME matrix computed at step 308.

The sequence then proceeds to step 324 whereat CFRAME is recomputed using formula (9) with the newly computed values for BT and WT, and then to step 326 whereat an updated value for the swivel angle BC of bracket 70 of supply side redirect roller assembly 64 is computed such that a plane containing point C, the centerpoint of axis 78 of roller 68, and point E is perpendicular a vector for the fiber band 62. The updated value of angle BC is found in a manner similar to the updated value of BT computed at step 310, i.e., by setting the cross product of the fiber band vector and the vector from point E to point C equal to zero such that $$BC = \tan^{-1} \frac{-[E_{12}(E_{14} - CP(1)) + E_{22}(E_{24} - CP(2)) + E_{32}(E_{34} - CP(3))]}{E_{13}(E_{14} - CP(1)) + E_{23}(E_{24} - CP(2)) + E_{33}(E_{34} - CP(3))} \quad (21)$$

where the values $E_{ab}$ are from the constant EFRAME matrix and where the point C position vector is [CP(1) CP(2) CP(3)] utilizing the $[\rho_x\ \rho_y\ \rho_z]$ vector values from the CFRAME matrix recomputed at step 324.

The sequence then proceeds to determine whether angle BC is such that head redirect roller 68 would point toward head redirect roller 72. To this end, a value of EROT is computed at step 328 such that $$EROT = (EFRAME)(ROT_{x(BC)}) \quad (22)$$

with the newly calculated value for BC. The result of formula (22) will have the solution for the EROT matrix shown in Table I. Thereafter, the dot product (EDOTPRO) between the local z vector at E and the vector pointing from point E to point B is computed at step 330 based upon the $\rho$ vector of the constant EFRAME matrix and the $\gamma$ and $\rho$ vectors of the EROT matrix as follows:

$$EDOTPRO = (-E_{12} \sin BC + E_{13} \cos BC)(E_{14} - 0) + (-E_{22} \sin BC + E_{23} \cos BC)(E_{24} - 9.74) + (-E_{32} \sin BC + E_{33} \cos BC)(E_{34} - 13.39) \quad (23)$$

The computed value of EDOTPRO is then tested at decision step 332 and, if it is less than zero, then redirect roller 68 would be pointing the wrong direction, so BC is corrected by adding 180° at step 334, thus:

$$BC = BC + 180° \quad (24)$$

If EDOTPRO is not less than zero at step 332, or after correcting BC at step 334, an updated value of WC is computed by first recomputing EFRAME' at step 336 by recomputing formula (12) with the newly computed value of BC and then computing WC at step 338 in a two step iteration wherein the following formula is performed twice:

$$WC = WC - \frac{(\sin WC)(C3) + (\cos WC)(C4) + RD_5}{(\cos WC)(C3) - (\sin WC)(C4)} \quad (25)$$

with the value for WC computed after performing formula (25) the first time being used to compute a final value of WC the second time formula (25) is performed so as to approximate two loops through a Newton Raphson search; and wherein $$C3 = E_{11}'(E_{14}' - CP(1)) + E_{21}'(E_{24}' - CP(2)) + E_{31}'(E_{34}' - CP(3)) \quad (26)$$

and $$C4 = E_{13}'(E_{14}' - CP(1)) + E_{23}'(E_{24}' - CP(2)) + E_{33}'(E_{34}' - CP(3)) \quad (27)$$

from the newly computed EFRAME' matrix and the $\rho$ vector of the CFRAME matrix recomputed at step 324.

The sequence then proceeds to step 340 whereat DFRAME is recomputed using formula (11) with the newly computed values for BC and WC. The resulting DFRAME matrix is available for subsequent use by control 120. If the recomputed DFRAME matrix is not to be used by control 120, step 340 may be dispensed with. On the other hand, the recomputed CFRAME at step 324 is available to compute swivel commands for supply side redirect roller assembly 64 if desired. It will be evident, however, that CFRAME is to be computed in the sequence of FIG. 7C and, thus, data is available from servo supervisor 124 to provide swivel commands for one or both of the redirect roller assemblies.

After the swivel command for head redirect roller assembly 66 is computed in the sequence of FIG. 7B, it is communicated to dual port memory 150 of servo I/O 126 for control of the swivel angle of that assembly. The amount of swivel of supply side redirect swivel roller assembly 64 is typically not more than ±15-20°, whereas the range of swivel of head side redirect roller assembly 66 could be as much as ±90°. Thus, in a preferred embodiment, only SCMD for head side redirect roller assembly 66 is utilized as that assembly appears to be most critical as head 36 moves relative creel assembly 52. To this end, as seen in FIG. 7D, the servo procedure is initiated every 10 milliseconds (step 400). At process steps 402 and 404, resolver data from resolver 102 is read by resolver interface 158 and microprocessor unit 152 calculates the actual swivel angle position (ACT POS) of bracket 74 of redirect roller assembly 66. At process step 406, a command swivel position (CMD POS) is calculated by summing the interation change in joint position command (# JOINT CMD) (i.e., SCMD from servo supervisor 124) with the current value of command swivel position CMD POS. Also, at process step 406, a following error signal (FE) is calculated as the difference between the calculated command swivel position (CMD POS) and the actual swivel position (ACT POS). At step 408, the following error signal (FE) is modified by adding in the velocity feed forward component $V_{FF}$ calculated by the servo supervisor 124 (and also placed in dual port memory 150). The sequence proceeds to process step 410 where the velocity command (VCMD) to motor 92 is calculated as the product of FE, the gain factor (GF) and an output unit conversion constant K. The VCMD signal is then converted to a voltage signal (swivel control signal) and coupled to motor 92 through drive amplifier 104 to automatically and drivingly swivel roller assembly 66. The gain factor (GF) is selected so that the voltage of the swivel control signal corresponding to VCMD will result in movement of the bracket at a predetermined velocity correlated to a predetermined error signal, e.g., 1°/min for one-thousandth degree error signal (1°/min per 1/1000° FE). The gain factor GF facilitates for correction of known offsets and/or relationships in the gear/pulley mechanisms, for example. Similarly, the output unit conversion constant K is a proportionally constant to obtain 1°/min angular velocity of motor 92 per 0.001 volt output from driver interface 162. The constant K may alternatively be incorporated directly into the circuitry of the digital to analog converter (not shown) which converts the digital VCMD signal to an analog swivel control signal which is then applied to drive the motor.

Figure 8:
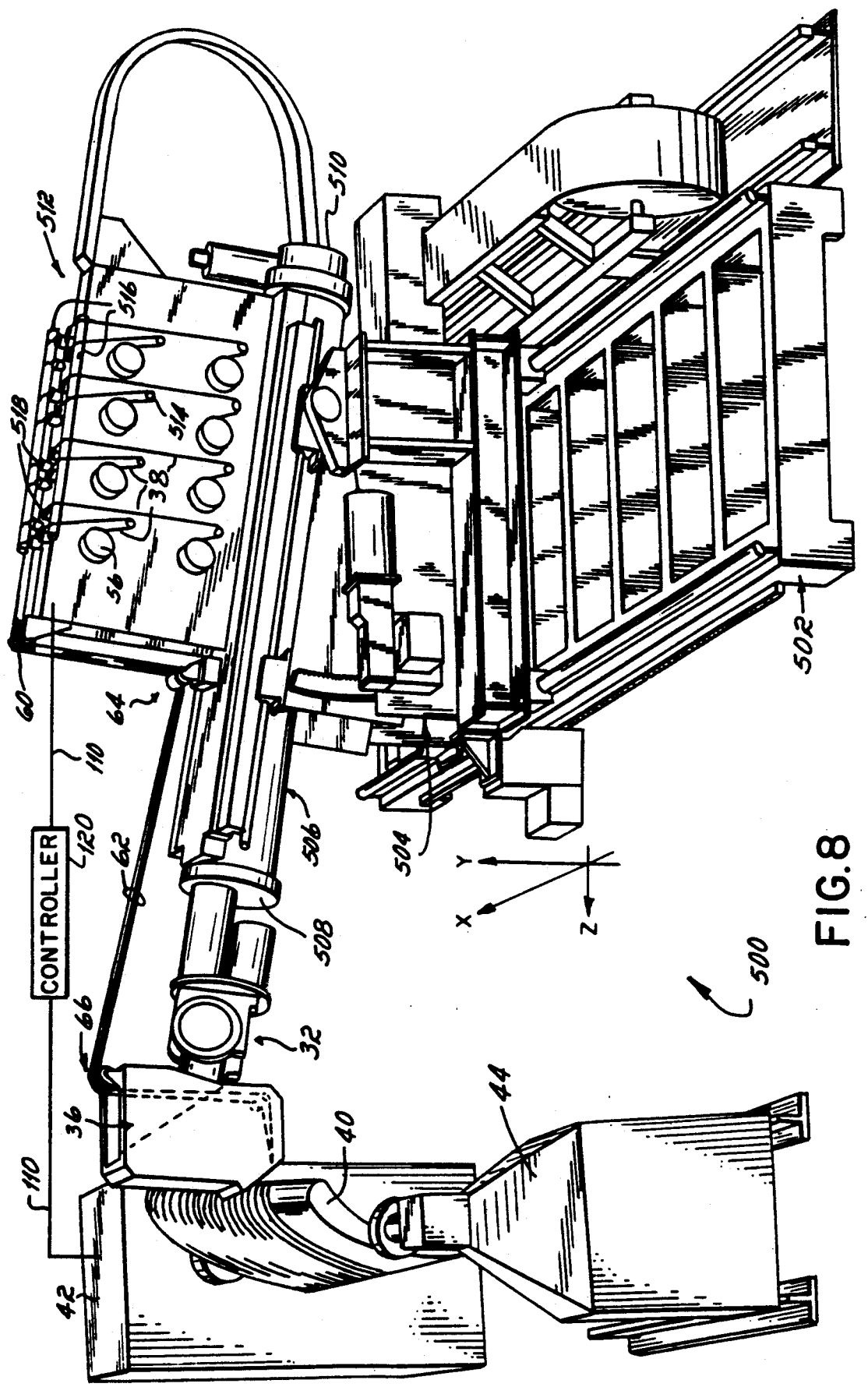
FIG. 8 is a perspective view of a second, exemplary fiber placement machine to which the present invention is applicable.

An alternative fiber placement machine 500 to which the present invention is applicable is shown in FIG. 8. Machine 500 is a tilt-cross feed machine as shown and described in U.S. application Ser. No. 07/445,583, entitled "Fiber Placement Machine", filed Dec. 4, 1989, now U.S. Pat. No. 5,022,952, and assigned to the assignee hereof. The disclosure of said application Ser. No. 07/445,583 is incorporated herein by reference. Machine 500 is shown laterally spaced with respect to mandrel 40 and comprises a base support 502 which supports a carriage 504 for movement therealong to define the x-axis of movement of machine 500. Mounted to carriage 504 is a cross-slide 506 to permit tilting or pivotal movement of the forward end 508 thereof defining the Y-axis of motion of machine 500. Cross-slide 506 is also mounted to carriage 504 for movement toward and away from mandrel 40 to define the Z-axis of motion of machine 500.

Mounted to the rearward end 510 of cross-slide 506 is creel assembly 512 rotatably supporting a plurality of spools 56 of fiber tows 38. Each spool 56 supplies a tow 38 which passes over a first roller 514 adjacent each spool 56, and is then directed over the top of creel assembly 512 by roller bar 516. Each tow 38 then passes about an orientation roller 518 and then to grooved roller 60 for collimation in a band 62 of such tows. Band 62 then passes over supply side and head side redirect roller assemblies 64, 66 to fiber placement head 36 mounted to robot wrist 32. As head 36 moves in the pitch, yaw and roll directions (also referred to as roll1, roll2 and roll3), head 36 will move relative creel assembly 512 thereby twisting band 62 of tows 38. Operation of machine 500 is in response to signals over lines 110 from controller 120 generally as described with respect to machine 10 of FIG. 1, except that the procedure of FIG. 7C utilizes the transformed data from step 236 of FIG. 7B rather than ABSCMD data from step 234 thereof so as to reduce or eliminate the effect of the tilt axis of machine 500 in the computations for the redirect roller swivel angles.

In operation, control 120 will repeatedly generate change in position command signals by which to cause fiber placement head 36 to move and apply fiber tows to mandrel 40. With each newly generated change in position command signal, the swivel angles of the redirect rollers will be computed so as to maintain proper alignment of the fiber band 62 as it passes between the redirect rollers. To this end, the redirect roller swivel angles are computed such that the longitudinal axis of each tow 38 will be held perpendicular the axis of rotation of each redirect roller as it passes thereover, especially as it exits from supply side redirect roller 68 and enters onto head side redirect roller 72. As a consequence, the width of band 62 (a vector normal the longitudinal axis of the band) will be parallel the roller longitudinal axes as the band 62 passes thereover and especially as it exits roller 68 and enters onto roller 72. The resulting swivel commands are utilized to generate swivel control signals to drivingly swivel at least one of the redirect roller assemblies, such as head side redirect roller assembly 66, to compensate for movement of head 36.

While the present invention has been illustrated by description of alternative embodiments and while the alternative embodiments have been described in considerable detail, it is not the intention of the applicants to restrict or in any way limit the scope of the appended claims to such detail. Additional advantages and modifications will readily appear to those skilled in the art. For example, although control 120 is shown as performing numerous matrix multiplications, where certain values are zero or 1, the results need not be computed. Similarly, where only partial results are needed, the entire matrix multiplication need not occur. The invention in its broader aspects is therefore not limited to the specific details, representative apparatus and method, and illustrative example shown and described. Accordingly, departures may be made from such details without departing from the spirit or scope of Applicant's general inventive concept.

TABLE I

| Item | Matrix | Solution |
|---|---|---|
| (9) | BFRAME = | $\begin{bmatrix} B_{11} & B_{12} & B_{13} & B_{14} \\ B_{21} & B_{22} & B_{23} & B_{24} \\ B_{31} & B_{32} & B_{33} & B_{34} \\ 0 & 0 & 0 & 1 \end{bmatrix}$ |
| (10) | BFRAME' = | $\begin{bmatrix} B_{11}' & B_{12}' & B_{13}' & B_{14}' \\ B_{21}' & B_{22}' & B_{23}' & B_{24}' \\ B_{31}' & B_{32}' & B_{33}' & B_{34}' \\ 0 & 0 & 0 & 1 \end{bmatrix}$ |
| (11) | CFRAME = | $\begin{bmatrix} B_{11}'\cos WT - B_{13}'\sin WT & B_{12}' & B_{11}'\sin WT + B_{13}'\cos WT & B_{14}' + RD_H(B_{11}'\sin WT + B_{13}'\cos WT) \\ B_{21}'\cos WT - B_{23}'\sin WT & B_{22}' & B_{21}'\sin WT + B_{23}'\cos WT & B_{24}' + RD_H(B_{21}'\sin WT + B_{23}'\cos WT) \\ B_{31}'\cos WT - B_{33}'\sin WT & B_{32}' & B_{31}'\sin WT + B_{33}'\cos WT & B_{34}' + RD_H(B_{31}'\sin WT + B_{33}'\cos WT) \\ 0 & 0 & 0 & 1 \end{bmatrix}$ |

TABLE I-continued

| Item | Matrix | Solution |
|------|--------|----------|
| (12) | EFRAME' = | $\begin{bmatrix} E_{11}' & E_{12}' & E_{13}' & E_{14}' \\ E_{21}' & E_{22}' & E_{23}' & E_{24}' \\ E_{31}' & E_{32}' & E_{33}' & E_{34}' \\ 0 & 0 & 0 & 1 \end{bmatrix}$ |
| (15) | BROT = | $\begin{bmatrix} B_{11} & B_{12}\cos BT + B_{13}\sin BT & -B_{12}\sin BT + B_{13}\cos BT & B_{14} \\ B_{21} & B_{22}\cos BT + B_{23}\sin BT & -B_{22}\sin BT + B_{23}\cos BT & B_{24} \\ B_{31} & B_{32}\cos BT + B_{33}\sin BT & -B_{32}\sin BT + B_{33}\cos BT & B_{34} \\ 0 & 0 & 0 & 1 \end{bmatrix}$ |
| (16) | EROT = | $\begin{bmatrix} E_{11} & E_{12}\cos BC + E_{13}\sin BC & -E_{12}\sin BC + E_{13}\cos BC & E_{14} \\ E_{21} & E_{22}\cos BC + E_{23}\sin BC & -E_{22}\sin BC + E_{23}\cos BC & E_{24} \\ E_{31} & E_{32}\cos BC + E_{33}\sin BC & -E_{32}\sin BC + E_{33}\cos BC & E_{34} \\ 0 & 0 & 0 & 1 \end{bmatrix}$ |

What is claimed is:

1. A program controlled fiber placement apparatus comprising:
   creel means for providing a plurality of fiber tows to be applied to a mandrel;
   placement means being movable under program control relative said creel means for applying the fiber tows to the mandrel;
   a pair of redirect rolls, a first of said redirect rollers being positioned adjacent said creel means, a second of said redirect rollers being positioned adjacent said placement means, each said redirect roller being rotatable about a longitudinal axis and swivellable about an axis transverse said longitudinal axis to guide the fiber tows thereover in a band between said creel means and said placement means; and
   control means for swivelling at least said second redirect roller by an amount related to commanded movement of said placement means relative said creel means so as to maintain alignment of the fiber band between said creel means and said placement means such that a vector normal the fiber band and across the width thereof is parallel the longitudinal axis of rotation of said second redirect roller as the fiber band passes thereover.

2. The program controlled fiber placement apparatus of claim 1, said second redirect roller being associated with said placement means so as to be movable therewith.

3. The program controlled fiber placement apparatus of claim 2, said first redirect roller being associated with said creel means.

4. The program controlled fiber placement apparatus of claim 1, said control means further for swivelling said first redirect roller by an amount related to commanded movement of said placement means relative said creel means so as to maintain alignment of the fiber band between said creel means and said placement means such that a vector normal the fiber band and across the width thereof is also parallel the longitudinal axis of rotation of said first redirect roller as the fiber band passes thereover.

5. A method of maintaining alignment of a band of fiber tows between a creel supply thereof and a movable placement head in a computer controlled fiber placement machine, the method comprising:
   passing the band of fiber tows over a first redirect roller positioned adjacent the creel supply and over a second redirect roller positioned adjacent the placement head, each said redirect roller having a longitudinal axis of rotation and being swivellable about an axis transverse the longitudinal axis of rotation;
   commanding movement of the placement head to cause movement thereof relative the creel supply; and
   automatically swivelling at least the second redirect roller by an amount related to the movement of the placement head relative the creel supply so as to maintain alignment of the fiber band between the creel supply and the placement head such that a vector normal the fiber band and across the width thereof is parallel the longitudinal axis of rotation of said second redirect roller as the fiber band passes thereover.

6. The method of claim 5, further comprising:
   generating absolute commanded position signals upon which movement of the placement head relative the creel supply is commanded; and
   computing from said absolute commanded position signals a swivel angle of the second redirect roller and upon which the second redirect roller is automatically swivelled.

7. The method of claim 5 further comprising automatically swivelling the first redirect roller by an amount related to the commanded movement of the placement head relative the creel supply so as to maintain alignment of the fiber band between the creel supply and the placement head such that a vector normal the fiber band and across the width thereof is also parallel the longitudinal axis of rotation of the first redirect roller as the fiber band passes thereover.

8. A program controlled fiber placement apparatus comprising:

creel means for providing a plurality of fiber tows to be applied to a mandrel;

placement means being movable under program control relative said creel means for applying the fiber tows to the mandrel;

a pair of redirect rollers, a first of said redirect rollers being positioned adjacent said creel means, a second of said redirect rollers being positioned adjacent said placement means, each said redirect roller being rotatable about a longitudinal axis and swivellable about an axis transverse said longitudinal axis to guide the fiber tows thereover in a band between said creel means and said placement means; and control means for swivelling at least said first redirect roller by an amount related to commanded movement of said placement means relative said creel means so as to maintain alignment of the fiber band between said creel means and said placement means such that a vector normal the fiber band and across the width thereof is parallel the longitudinal axis of rotation of said first redirect roller as the fiber band passes thereover.

9. The program controlled fiber placement apparatus of claim 8, said first redirect roller being associated with said creel means.

10. The program controlled fiber placement apparatus of claim 9, said second redirect roller being associated with said placement means so as to be movable therewith.

11. A method of maintaining alignment of a band of fiber tows between a creel supply thereof and a movable placement head in a computer controlled fiber placement machine, the method comprising:

passing the band of fiber tows over a first redirect roller positioned adjacent the creel supply and over a second redirect roller positioned adjacent the placement head, each said redirect roller having a longitudinal axis of rotation and being swivellable about an axis transverse the longitudinal axis of rotation;

commanding movement of the placement head to cause movement of the placement head relative the creel supply;

automatically swivelling at least the first redirect roller by an amount related to the commanded movement of the placement head relative the creel supply so as to maintain alignment of the fiber band between the creel supply and the placement head such that a vector normal the fiber band and across the width thereof is parallel the longitudinal axis of rotation of said first redirect roller as the fiber band passes thereover.

12. The program controlled fiber placement apparatus of claim 1, said control means including:

means for generating absolute commanded position signals from which to command movement of said placement means relative said creel means; and means responsive to the absolute commanded position signals for computing a swivel angle of said second redirect roller related to the absolute commanded position signals and from which to command said second redirect roller to swivel.

* * * * *